3,362,926
RESINOUS COMPOSITIONS CONTAINING BI-
CYCLIC ESTER-LACTONES AS PLASTICIZ-
ERS THEREIN
James C. Wygant, Creve Coeur, and Erhard J. Prill, Des
Peres, Mo., assignors to Monsanto Company, St. Louis,
Mo., a corporation of Delaware
No Drawing. Original application Oct. 12, 1961, Ser. No.
144,567, now Patent No. 3,256,300, dated June 14,
1966. Divided and this application Oct. 22, 1965, Ser.
No. 502,393
4 Claims. (Cl. 260—30.4)

ABSTRACT OF THE DISCLOSURE

A resinous composition comprising a vinyl halide polymer, such as polyvinyl chloride, or a copolymer of at least 70 weight percent of a vinyl halide with up to 30 weight percent of an unsaturated comonomer copolymerizable therewith, together with an effective plasticizing amount of a bicyclic ester-lactone of an alkyl-$\Delta^4$-tetrahydrophthalic anhydride defined by the illustrative structural formula

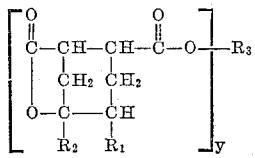

wherein $y$ is an integer from 1 to 2, $R_1$ and $R_2$ each are lower alkyl groups preferably containing up to 6 carbon atoms and $R_1$ also may be hydrogen, and $R_3$ is a monovalent alkyl, aralkyl, haloaralkyl, or alkenyl radical preferably containing up to 20 carbon atoms when $y$ is 1, or the equivalent divalent radical when $y$ is 2.

---

The instant application is a divisional application of our parent copending application Ser. No. 144,567, filed Oct. 12, 1961, now U.S. Patent No. 3,256,300, which parent application discloses and claims a limited class of novel bicyclic ester-lactone compounds.

This invention relates to the use of bicyclic ester-lactones of alkyl-$\Delta^4$-tetrahydrophthalic anhydrides as plasticizers in resinous compositions. More particularly this invention relates to polyvinyl halide resin compositions containing a plasticizing amount of a bicyclic ester-lactone and methods for producing the same.

One object of this invention is to provide methods for plasticizing polyvinyl halide resins by incorporating therewith a plasticizing amount of a bicyclic ester-lactone of an alkyl-$\Delta^4$-tetrahydrophthalic anhydride.

Another object of this invention is to provide polyvinyl halide resin compositions containing a plasticizing amount of a bicyclic ester-lactone of an alkyl-$\Delta^4$-tetrahydrophthalic anhydride.

Other objects and advantages of this invention will be apparent to one skilled in the art upon studying this disclosure.

In accordance with this invention, an alkyl-$\Delta^4$-tetrahydrophthalic acid-lactone salt is reacted with an organic halide to form an alkyl-$\Delta^4$-tetrahydrophthalic ester-lactone as illustrated by the following equation:

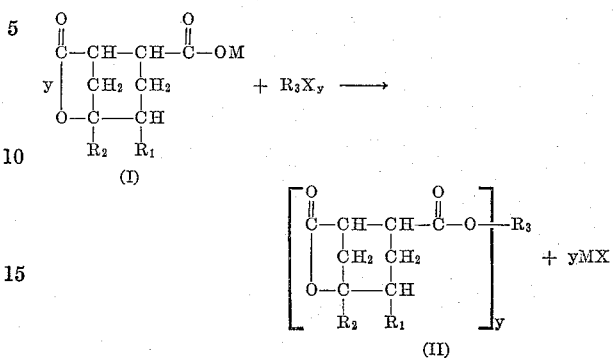

wherein $R_1$ is selected from the group consisting of hydrogen and alkyl, $R_2$ is alkyl, M is selected from the group consisting of alkali metal and tertiary ammonium ion, X is selected from the group consisting of chlorine, bromine and iodine, $R_3$ is selected from the group consisting of alkyl, aralkyl, haloaralkyl, and alkenyl, and $y$ is a whole number selected from the group consisting of 1 and 2.

Further, in accordance with this invention, there are provided methods for plasticizing polyvinyl halide resins by incorporating with said resins a plasticizing amount of a bicyclic ester-lactone of the Formula II above.

The alkyl-$\Delta^4$-tetrahydrophthalic acid-lactone reactants suitable for use in this invention can be prepared as disclosed and claimed in copending application Ser. No. 144,585, filed Oct. 12, 1961, and now abandoned, by the acid-catalyzed hydrolysis/lactonization of an alkyl-$\Delta^4$-tetrahydrophthalic anhydride. The alkyl-$\Delta^4$-tetrahydrophthalic anhydrides suitable for use in this invention have alkyl groups on either one or both of the carbon atoms comprising the ethylenic unsaturation. There must be at least one alkyl group, as represented by $R_2$ in the formula above, in order for the bicyclic acid-lactone to be formed from the corresponding anhydride by hydrolysis and lactonization in substantial yield. Thus, $R_1$ in the formula above may be either hydrogen or alkyl but $R_2$ must always be alkyl. The alkyl radicals as represented by $R_1$ and $R_2$ are lower alkyl radicals and ordinarily are alkyl radicals having not more than 6 carbon atoms. Examples of some suitable alkyl radicals include methyl, ethyl, isopropyl, butyl, tert-butyl, hexyl, and the like. The alkyl-$\Delta^4$-tetrahydrophthalic anhydrides are known to those skilled in the art and are readily prepared by heating an alkyl-substituted butadiene, for example, 2-methyl-1,3-butadiene with maleic anhydride, preferably in a hydrocarbon solvent.

The bicyclic acid-lactone reactants are preferably used in the form of either an alkali metal or a tertiary amine salt. Thus, M in the equation above is selected from the group consisting of alkali metal and tertiary ammonium ion. The alkali metal may be either sodium, potassium or lithium. The tertiary amine is preferably a saturated tertiary aliphatic amine containing from 1 to 24 carbon atoms. Preferably, the amine is a tertiary alkylamine.

Examples of suitable tertiary amines include trimethylamine, triethylamine, tri-n-propylamine, triisopropylamine, trihexylamine, methyldiethylamine, dimethylethylamine, dimethylcyclohexylamine, diethylhexylamine, and the like.

The organic halide reactants identified by $R_3X_y$ in the equation above may be any mono or dihalide wherein $R_3$ is either an alkyl, aralkyl, haloaralkyl, or alkenyl monovalent radical when a monohalide is employed, i.e. $y$ is 1, or the equivalent divalent radical containing 1 less hydrogen atom when a dihalide is employed, i.e. $y$ is 2. These radicals may be either straight-chain or branched-chain and preferably contain fewer than 21 carbon atoms even though this invention is not limited by the number of carbon atoms in the $R_3$ radical. Examples of suitable alkyl radicals include methyl, ethyl, isopropyl, tert-butyl, octyl, dodecyl, hexadecyl, eicosyl, and the like. Examples of suitable aralkyl radicals include benzyl, amylbenzyl, phenylethyl, phenylpropyl, and the like. Examples of suitable haloaralkyl radicals include 2-chlorobenzyl, 4-bromobenzyl, 5-iodobenzyl, 2,6-dibromobenzyl, 3,4-dichlorobenzyl, and the like. Examples of suitable alkenyl radicals include propenyl, hexenyl, decenyl, pentadecenyl, and the like. The halide, as represented by X in the formula in the equation above, may be any halide but preferably is either chlorine, bromine, or iodine. The organic halide is either a mono or a dihalide depending upon whether $y$ in the equation above is either a whole number of 1 or 2. The halogens in the dihalides may be either the same or different but preferably are the same.

The bicyclic acid-lactone salts are prepared by methods well known to those skilled in the art. For example, the alkali metal acid-lactone salts can be readily prepared by neutralizing the acid-lactone with an alkali metal carbonate solution for example, sodium carbonate, and removing the liquid by evaporation. The tertiary amine acid-lactone salts can be prepared by reacting a stoichiometric amount of the acid-lactone and the tertiary amine at room temperature; however, a temperature up to 200° C. is often used. In a preferred embodiment the tertiary amine acid-lactone salt is formed in situ by reacting the acid-lactone with the tertiary amine in the presence of the organic halide without first forming the salt and recovering it as such.

The process is usually carried out at a temperature below about 200° C. because the use of more elevated temperatures sometimes results in the formation of the diester of the $\Delta^4$-tetrahydrophthalic anhydride. The process can be conducted at temperatures as low as 50° C.; however, it is usually desirable to use a higher temperature in order to have a relatively short reaction time. Preferably a temperature in the range of 100–175° C. is used. Ordinarily the reactions involved are carried out at substantially atmospheric pressure although pressures above atmospheric may be employed with more volatile reactants. An inert diluent or solvent is not normally used although an inert reaction medium could be used if desired. The reactions are usually carried out using stoichiometric proportions of reactants or, preferably, a slight excess of the organic halide reactant. Thus, the formation of the bis(bicyclic ester-lactones) requires the use of at least 2 moles of the acid-lactone per mole of the organic dihalide. In the embodiment employing the tertiary amine acid-lactone salt formed in situ, a molecular equivalent of the tertiary amine is used. Thus, in this embodiment, the tertiary amine is in effect a reactant, not a catalyst. However, the tertiary amine can be used as a catalyst in the embodiment employing the alkali metal acid-lactone salt and for this use a catalytic amount, i.e., less than 10% of the tertiary amine, is added to the reaction mixture. No other catalyst is ordinarily required in the process.

The bicyclic ester-lactone is recovered from the reaction mixture and purified in the usual manner such as by distillation, solvent extraction, selective adsorption, filtration, decantation or crystallization procedures.

The bicyclic ester-lactone products are stable liquid compounds which range in color from colorless to a light yellow and which range in viscosity from very fluid to very viscous. The boiling points of these compounds are very high, usually above about 200° C. These bicyclic ester-lactones have good solvent properties and are soluble in heptane, benzene, alcohols, ethers, ketones, and the like, but are insoluble in water.

The bicyclic ester-lactone products are advantageously used for a variety of industrial purposes. Since these ester-lactones are characterized by having low volatility and good viscosity characteristics, they find use as functional fluids in hydraulic fluid systems as well as vacuum systems. Also, since the bicyclic ester-lactones are characterized by having low volatility and low extractibility characteristics, they find extensive use as plasticizers for various synthetic resins, particularly the vinyl halide resins, such as polyvinyl chloride, to form softened compositions of increased resiliency and flexibility which is retained at low temperatures as well as at high temperatures. These bicyclic ester-lactones are also compatible with other polymers such as polyvinyl butyral, cellulose acetate butyrate, polystyrene and certain polyacrylates.

The advantages, desirability, and usefulness of the present invention are illustrated by the following examples.

Example 1

In this example, 1,4-tetramethylene bis(5-methyl-6-oxa-7-oxobicyclo[3.2.1]octane-2-carboxylate) was prepared from 0.32 mole of 5-methyl-6-oxa-7-oxobicyclo[3.2.1]octane-2-carboxylic acid, 0.15 mole of 1,4-dichlorobutane and 0.32 mole of triethylamine. The reactants were heated together in a reaction flask at a temperature in the range of 100–150° C. for a period of 4 hours. Thereafter, the reaction mixture was diluted with diethyl ether and successively washed with water, dilute hydrochloric acid, water, dilute sodium hydroxide and water. The washed reaction mixture was then distilled under vacuum to obtain the 1,4-tetramethylene bis(5-methyl - 6 - oxa-7-oxobicyclo[3.2.1]octane-2-carboxylate) boiling at 190–290° C./0.3 mm. Analysis of the product was found to be 62.3% carbon and 7.2% hydrogen as compared with calculated values of 62.6% carbon and 7.2% hydrogen.

Example 2

In this example, benzyl 5-methyl-6-oxa-7-oxobicyclo [3.2.1]octane-2-carboxylate was prepared from 0.42 mole of sodium 5-methyl-6-oxa-7-oxobicyclo[3.2.1]octane-2-carboxylate and 0.84 mole of benzyl chloride using 1 ml. of triethylamine as catalyst. The reactants and catalysts were heated together in a reaction flask at a temperature in the range of 110–120° C. for a period of time of 4 hours. Thereafter, the reaction mixture was diluted with diethyl ether and successively washed with water, dilute hydrochloric acid, water, dilute sodium hydroxide and water. The washed reaction mixture was then distilled under vacuum to obtain the benzyl 5-methyl - 6 - oxa - 7-oxobicyclo[3.2.1]octane-2-carboxylate boiling at 180–184° C./0.1 mm. Hg and having a refractive index $n_D^{25}$ 1.5289. The product was obtained in a yield of 91%. Analysis of the product was found to be 69.8% carbon and 7.1% hydrogen as compared with calculated values of 70.1% carbon and 6.6% hydrogen.

Example 3

In this example, the plasticizer properties of certain bicyclic ester-lactones of this invention was determined for use in polyvinyl chloride resins. A resin composition was formulated comprising 60 parts of the polyvinyl chloride resins and 40 parts of the bicyclic ester-lactones, including ¼ phr. of dibasic lead stearate at a heat stabilizer. These materials were mixed in a rolling mill to form a homogeneous blend. Visual inspection of the composition showed that all of the bicyclic ester-lactones were compatible with the polyvinyl chloride. Molded sheets of the mixture were clear and transparent. A resin composition containing tridecyl 5-methyl-6-oxa-7-oxobicyclo[3.2.1]octane-2-carboxylate was found to have a low-temperature flex point of −10° C., volatility of 1.8% plasticizer lost, kerosene extraction of 1.6% plasticizer lost and loop compatibility. A composition containing benzyl 5 - methyl-6-oxa-7-oxobicyclo[3.2.1] octane-2-carboxylate was found to have a low temperature flex point of 11° C., volatility of 5.2% plasticizer lost, kerosene extraction of 0.25% plasticizer lost, and loop compatibility. The low temperature flexibility was determined in each case according to the Clash-Berg method wherein the tortional flexibility of the sample is determined at various temperatures. The volatility was determined according to the Carbon Absorption method of the Society of the Plastic Industry. The amount of kerosene extraction was determined by immersion of a sample in kerosene for a period of 24 hours, followed by a determination of the loss in weight of the sample.

The ratio of bicyclic ester-lactone to polyvinyl halide resin in the polyvinyl halide resin compositions of this invention may be varied over a wide range, depending upon the properties desired in the final product. For some purposes, a plasticizer content of say from only 2 to 5% would be desirable; however, usually a plasticizer content above 10% is used. The present bicyclic ester-lactone products are compatible with polyvinyl chloride over wide ranges and concentrations up to 50% of bicyclic ester-lactone based on the total weight of the plasticized composition.

This invention has been described particularly with reference to the use of the present bicyclic ester-lactones as plasticizers for polyvinyl chloride, but these bicyclic ester-lactones are also advantageously employed as plasticizers for copolymers of vinyl chloride, for example, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers, and the like. Preferably such copolymers have vinyl chloride contents of at least 70% by weight and up to 30% by weight of the copolymerizible monomer.

The plasticized polyvinyl halide compositions of the present invention have good thermal stability; however, it may be desirable for various purposes to include known stabilizers in the plasticized compositions. In as much as the present bicyclic ester-lactones are substantially unreactive with the commercially available heat and light stabilizers which are commonly employed with polyvinyl halide resins, the presence of such materials in the plasticized compositions does not impair the valuable properties of the bicyclic ester-lactones.

The bicyclic ester-lactones, either singularly or in combination, are incorporated with the polyvinyl halide resin to form a plasticized polyvinyl halide resin by either milling or by dissolving therein the plasticizer in a mutual solvent and allowing the solvent to evaporate, or by any other conventional technique. Colors, dyes, extenders, pigments, and other compounding ingredients can be included in the plasticized polyvinyl halide composition if it is so desired.

Reasonable variation and modification of the invention as described are possible, the essence of which is that there have been provided: (1) methods for plasticizing polyvinyl halide resins by incorporating therewith a plasticizing amount of the above-defined bicyclic ester-lactones, and (2) plasticized polyvinyl halide compositions containing a plasticizing amount of said bicyclic ester-lactones.

We claim:
1. A resinous composition comprising a vinyl halide polymer plasticized with a bicyclic ester-lactone of alkyl-Δ⁴-tetrahydrophthalic anhydride defined by the structural formula

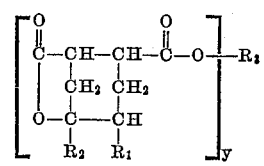

wherein $y$ is an integer from 1 to 2; $R_1$ is hydrogen or a lower alkyl group containing up to 6 carbon atoms; $R_2$ is a lower alkyl group containing up to 6 carbon atoms; and $R_3$ is a monovalent alkyl, aralkyl, haloaralkyl or alkenyl radical containing up to 20 carbon atoms when $y$ is 1, or the equvialent divalent radical containing 1 less hydrogen atom when $y$ is 2.

2. A resinous composition comprising a copolymer of at least 70% by weight of vinyl chloride and up to 30% by weight of an unsaturated comonomer copolymerizible therewith, said copolymer being plasticized with a bicyclic ester-lactone of alkyl-Δ⁴-tetrahydrophthalic anhydride as defined in claim 1.

3. A resinous composition comprising a vinyl chloride polymer plasticized with benzyl 5-methyl-6-oxa-7-oxobicyclo[3.2.1]octane-2-carboxylate.

4. A resinous composition comprising a vinyl chloride polymer plasticized with tridecyl 5-methyl-6-oxa-7-oxobicyclo[3.2.1]octane-2-carboxylate.

References Cited
UNITED STATES PATENTS

| | | | |
|---|---|---|---|
| 3,041,354 | 6/1962 | Olin | 260—30.4 |
| 3,198,810 | 8/1965 | Wygant et al. | 260—30.4 |
| 3,256,300 | 6/1966 | Wygant et al. | 260—30.4 |

MORRIS LIEBMAN, *Primary Examiner.*

R. S. BARON, *Assistant Examiner.*

PO-1050
(5/69)

UNITED STATES PATENT OFFICE
CERTIFICATE OF CORRECTION

Patent No. 3,362,926          Dated January 9, 1968

Inventor(s) James C. Wygant and Erhard J. Prill

It is certified that error appears in the above-identified patent and that said Letters Patent are hereby corrected as shown below:

Column 2, line 32, after paragraph ending "Formula II above." insert the following paragraph:
-- Further, in accordance with this invention, there are provided improved polyvinyl halide resin compositions comprising polyvinyl halide resin and a plasticizing amount of a bicyclic ester-lactone of the Formula II above. --

Column 3, line 41, that portion of the sentence reading "embodiment the" should read -- embodiment of this process, the --.

Column 4, line 74, the word "at" should read -- as --.

SIGNED AND
SEALED
AUG 26 1969

(SEAL)
Attest:

Edward M. Fletcher, Jr.
Attesting Officer

WILLIAM E. SCHUYLER, JR.
Commissioner of Patents